United States Patent Office 2,939,885
Patented June 7, 1960

2,939,885

PRODUCTION OF TRIALKYLBORANES

John C. Perrine, Jr., Pasadena, Calif., assignor to Olin Mathieson Chemical Corporation, a corporation of Virginia No Drawing. Filed July 29, 1957, Ser. No. 675,516

5 Claims. (Cl. 260—606.5)

This invention relates to a method for the production of trialkylboranes of the type RR'R"B wherein R, R' and R" are lower alkyl radicals, particularly those containing from 1 to 4 carbon atoms. As is described in U.S. Patent No. 2,266,776, to Leum, such trialkylboranes, in the form of amine addition products, are useful additives to diesel fuels and the like for the purpose of increasing their cetane number. In addition, such trialkylboranes are useful for the purpose described in Klein, Nadeau, Schoen and Bliss application Serial No. 614,768, filed October 8, 1956.

In accordance with the present invention, the trialkylboranes are produced by reacting a trialkylboroxine ($R_3B_3O_3$) and a Grignard reagent of the class R'MgX. R and R' are alkyl radicals containing from 1 to 4 carbon atoms, and X is a halogen atom, such as chlorine, bromine or iodine. In carrying out the reaction, the relative proportions of trialkylboroxine and Grignard reagent can be varied widely. Preferably, however, from 1 to 4 moles of the Grignard reagent are introduced into the reaction zone per mole of trialkylboroxine. As is conventional in conducting Grignard reactions, the Grignard reagent can be reacted with the trialkylboroxine while the Grignard reagent is in solution in any of a wide variety of ethers, such as dialkylethers containing from 2 to 4 carbon atoms in each alkyl radical, for example, diethyl ether, di-n-propylether, di-isopropyl ether, di-n-butylether and the like. On the other hand, the Grignard reagent can be in solution in a lower dialkyl ether of monoethylene glycol or of a polyethylene glycol such as diethylene glycol, triethylene glycol or tetraethylene glycol. Such dialkyl ethers are of the class $RO(CH_2CH_2O)_nR'$ wherein R and R' are alkyl radicals containing from 1 to 4 carbon atoms and $n$ is an integer from 1 to 4. Specific compounds falling within the class $RO(CH_2CH_2O)_nR'$ are the dimethyl ether of monoethylene glycol, the diethyl ether of monoethylene glycol, the monomethyl ether of diethylene glycol, the diethyl ether of diethylene glycol, and so forth. If desired, the reaction can also be conducted with the Grignard reagent dissolved in 1,1-diethoxy ethane or anisole. The reaction between the trialkylboroxine and the Grignard reagent is generally conducted at a temperature within the range from 0° C. to 250° C., although somewhat higher and somewhat lower reaction temperatures can also be used. After the reaction has been carried out to produce the trialkylborane, the desired product can be separated from the reaction mixture using conventional means, particularly by the precise fractionation of the reaction mixture.

The following example illustrates an embodiment which falls within the scope of this invention.

*Example*

A quantity of methyl magnesium iodide dissolved in 20 cc. of dibutoxytetraethylene glycol was placed in a 35 cc.-three necked flask fitted with a pressurized funnel, reflux condenser and stopper. The quantity of methyl magnesium iodide was prepared in the conventional manner using 5 grams of magnesium and 0.2 gram moles of methyl iodide. 0.015 gram mole of tributylboroxine was placed in the addition funnel. The top of the reflux condenser was connected to a vacuum source through a trap immersed in liquid nitrogen. The flask was then immersed in liquid nitrogen and evacuated. The liquid nitrogen bath was then removed from the flask and the flask was permitted to warm up to room temperature. Then the tributylboroxine was added dropwise while the reaction mixture was stirred with a magnetic stirrer. After the addition of the tributylboroxine had been completed, the temperature of the reaction mixture was then gradually warmed to the reflux temperature of the ether (about 175° C.). The volatile material produced in the reaction was collected in a trap cooled to −196° C. An infrared spectrum of this material showed it to be dimethylbutyl borane. The amount of dimethyl butyl borane produced was 0.025 gram moles.

What is claimed is:

1. A method for the production of a trialkylborane which comprises reacting one molar proportion of a trialkylboroxine of the formula $R_3B_3O_3$ and from 1 to 4 molar proportions of a compound of the class R'MgX at a temperature within the range from 0° C. to 250° C., and separating a compound of the formula $R(R')_2B$ from the reaction mixture, R being an alkyl radical containing from 1 to 4 carbon atoms, R' being an alkyl radical containing from 1 to 4 carbon atoms other than R, and X being a halogen selected from the group consisting of chlorine, bromine and iodine.

2. The method of claim 1 wherein X is chlorine.
3. The method of claim 1 wherein X is bromine.
4. The method of claim 1 wherein X is iodine.
5. The method of claim 1 wherein R is butyl, wherein R' is methyl and wherein X is iodine.

References Cited in the file of this patent

Krause et al.: Ber., vol. 64 (1931), pages 2112–2116.

Johnson et al.: "American Chem. Soc. Jour.," vol. 60, pages 115–121 (1938).

Kharasch et al.: "Grignard Reactions of Non-Metallic Substances," Prentice-Hall, New York (1954), page 38.

Mikhailov et al.: Chem. Abstracts, vol. 51, page 1026 (Jan. 25, 1957).